United States Patent
Heo et al.

(10) Patent No.: US 11,772,709 B2
(45) Date of Patent: Oct. 3, 2023

(54) VEHICLE BODY

(71) Applicants: Hyundai Motor Company, Seoul (KR); Kia Corporation, Seoul (KR)

(72) Inventors: Chul Hee Heo, Hwaseong-si (KR); Tae Gyu Park, Hwaseong-si (KR); Ho Yeon Kim, Daegu (KR); Sun Hyung Cho, Suwon-si (KR); Seok Ju Gim, Seongnam-si (KR); Ji Ae Yong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/376,359

(22) Filed: Jul. 15, 2021

(65) Prior Publication Data
US 2022/0185383 A1 Jun. 16, 2022

(30) Foreign Application Priority Data
Dec. 10, 2020 (KR) .......................... 10-2020-0172443

(51) Int. Cl.
*B62D 25/08* (2006.01)
*B62D 25/04* (2006.01)
*B62D 25/20* (2006.01)
*B62D 21/15* (2006.01)

(52) U.S. Cl.
CPC ........... *B62D 25/088* (2013.01); *B62D 25/04* (2013.01); *B62D 25/2036* (2013.01); *B62D 21/152* (2013.01)

(58) Field of Classification Search
CPC .................................................. B62D 25/088

USPC ................................... 296/198; 280/124.155
See application file for complete search history.

(56) References Cited

U.S. PATENT DOCUMENTS

| | | | |
|---|---|---|---|
| 4,108,469 | A | 8/1978 | Schwarzbich |
| 4,986,597 | A | 1/1991 | Clausen |
| 5,209,541 | A | 5/1993 | Janotik |
| 5,549,352 | A | 8/1996 | Janotik et al. |
| 5,692,798 | A | 12/1997 | Wehner et al. |
| 6,073,992 | A | 6/2000 | Yamauchi et al. |
| 6,135,498 | A | 10/2000 | Vlahovic |
| 6,282,790 | B1 | 9/2001 | Jaekel et al. |
| 6,334,642 | B1 | 1/2002 | Waldeck et al. |

(Continued)

FOREIGN PATENT DOCUMENTS

| | | |
|---|---|---|
| CN | 107054039 A | 8/2017 |
| CN | 112046615 A | 12/2020 |

(Continued)

OTHER PUBLICATIONS

European Patent Office, Extended European Search Report issued in Application No. 21186601.4, dated Jan. 1, 2022, 12 pages.

*Primary Examiner* — Dennis H Pedder
(74) *Attorney, Agent, or Firm* — Slater Matsil, LLP

(57) ABSTRACT

A vehicle body includes a plurality of shock absorber housings, each shock absorber housing adapted to cover and support a respective shock absorber connected to a respective wheel of a vehicle, wherein each of the shock absorber housings includes a projection projecting upwards from a lower end of the shock absorber housing with an internal space therein, wherein the lower end of the shock absorber housing or the projection is coupled to the shock absorber such that the shock absorber is disposed in the internal space in the projection.

19 Claims, 4 Drawing Sheets

(56) References Cited

U.S. PATENT DOCUMENTS

| | | |
|---|---|---|
| 6,824,204 B2 | 11/2004 | Gabbianelli et al. |
| 6,948,768 B2 | 9/2005 | Corcoran et al. |
| 7,677,646 B2 | 3/2010 | Nakamura |
| 8,998,216 B2 | 4/2015 | Maeda et al. |
| 9,004,499 B2 * | 4/2015 | Zeweke ................ B60G 17/00 280/6.16 |
| 10,800,224 B2 | 10/2020 | Sellars et al. |
| 11,505,260 B2 | 11/2022 | Heo et al. |
| 2010/0194086 A1 | 8/2010 | Yamamura et al. |
| 2012/0255799 A1 | 10/2012 | Kohler et al. |
| 2014/0124277 A1 | 5/2014 | Kurakawa et al. |
| 2014/0144719 A1 | 5/2014 | Morgan et al. |
| 2014/0224557 A1 | 8/2014 | Wu |
| 2015/0291056 A1 | 10/2015 | Nozaki |
| 2015/0343900 A1 | 12/2015 | Schlangen et al. |
| 2016/0347373 A1 | 12/2016 | An et al. |
| 2017/0174069 A1 | 6/2017 | Oyama et al. |
| 2017/0217296 A1 | 8/2017 | Nomura et al. |
| 2017/0225714 A1 * | 8/2017 | Ito ........................... B60L 53/16 |
| 2017/0225715 A1 | 8/2017 | Kobayashi et al. |
| 2017/0246942 A1 | 8/2017 | Takaki et al. |
| 2017/0334278 A1 | 11/2017 | Yamamoto |
| 2019/0118631 A1 | 4/2019 | Yamamoto et al. |
| 2019/0299737 A1 | 10/2019 | Sellars et al. |
| 2020/0039586 A1 | 2/2020 | Ayuzawa |
| 2020/0223303 A1 | 7/2020 | Saeki |
| 2020/0269922 A1 | 8/2020 | Kiyoshita et al. |
| 2020/0307701 A1 | 10/2020 | Park et al. |
| 2020/0324821 A1 | 10/2020 | Heo |
| 2021/0188028 A1 | 6/2021 | Lou et al. |
| 2021/0339617 A1 | 11/2021 | Ohkuma et al. |
| 2022/0097511 A1 | 3/2022 | Wang et al. |
| 2022/0176787 A1 | 6/2022 | Ostertag et al. |
| 2022/0185125 A1 | 6/2022 | Gim et al. |
| 2022/0185377 A1 | 6/2022 | Yong et al. |
| 2022/0388580 A1 | 12/2022 | Li et al. |
| 2023/0095674 A1 | 3/2023 | Inami et al. |

FOREIGN PATENT DOCUMENTS

| | | | |
|---|---|---|---|
| EP | 0856455 A2 | | 8/1998 |
| EP | 1084937 A2 | | 3/2001 |
| JP | 6597761 B2 | | 10/2019 |
| KR | 19980070976 A | | 10/1998 |
| KR | 2015118809 A | * | 10/2015 |
| WO | 2005066012 A1 | | 7/2005 |
| WO | 2018078989 A1 | | 5/2018 |

* cited by examiner

VEHICLE BODY

CROSS-REFERENCE TO RELATED APPLICATIONS

This application claims the benefit of Korean Patent Application No. 10-2020-0172443, filed on Dec. 10, 2020, which application is hereby incorporated herein by reference.

TECHNICAL FIELD

The present invention relates to a vehicle body.

BACKGROUND

In general, a vehicle body must be designed to allow various components in the vehicle to be mounted thereon and, when a collision impact is applied to the vehicle, to efficiently absorb the collision impact and thus to protect passengers in the vehicle from the collision impact.

A conventional vehicle requires a space in which an engine or a battery is mounted and a space in which wheels, a suspension device, a steering device and the like for driving the vehicle are mounted. Accordingly, because wheel housings for accommodating the wheels, the suspension device provided at the wheels, the steering device connecting the wheels to each other, the drive device for supplying driving force and the like occupy a considerable amount of space, the vehicle body must be designed to provide sufficient space to accommodate the components and to absorb impacts applied to the vehicle. Furthermore, as the number of associated components increases, the process of manufacturing and assembling the vehicle is increasingly complicated, and the time required to perform the process is increased.

In recent years, an in-wheel system, in which a drive unit, a steering unit, a reduction gear and the like are mounted, has been developed. In the in-wheel system, because there is no need to connect the individual wheels to each other, the vehicle body must also be designed differently from a conventional vehicle. Accordingly, when a vehicle adopts the in-wheel system, there is a need to develop a vehicle body capable of providing space for wheel housings, ensuring sufficient rigidity of the vehicle body and simplifying a process of manufacturing and assembling the vehicle body.

The details described as the background art are intended merely for the purpose of promoting understanding of the background of the present invention, and should not be construed as an acknowledgment of the prior art that is previously known to those of ordinary skill in the art.

SUMMARY

The present invention relates to a vehicle body. Particular embodiments relate to a vehicle body of an in-wheel platform vehicle, which includes a plurality of shock absorber housings positioned above respective wheels of the vehicle, each of the shock absorber housings being configured to cover and support a corresponding shock absorber connected to the wheel.

Embodiments the present invention can solve problems in the art, and an embodiment of the present invention provides a vehicle body of an in-wheel platform vehicle including a plurality of shock absorber housings, which are positioned above respective wheels of the vehicle and each of which includes a projection projecting upwards from the lower end thereof and having an internal space therein, in which a shock absorber connected to the wheel is disposed in the internal space in the projection and is coupled to the shock absorber so as to cover and support the shock absorber.

In accordance with embodiments of the present invention, a vehicle body includes a plurality of shock absorber housings adapted to cover and support respective shock absorbers connected to wheels of a vehicle, wherein each of the shock absorber housings includes a projection which projects upwards from a lower end of the shock absorber housing and has an internal space therein, and the lower end of each of the shock absorber housings or the projection is coupled to the shock absorber in a state in which the shock absorber is disposed in the internal space in the projection.

The internal space in the shock absorber housing may be configured to have a cylindrical shape, and the lower end of each of the shock absorber housings or the projection may be coupled to the shock absorber via a side surface or an upper surface of the internal space in the state in which the shock absorber is disposed in the internal space in the projection.

The lower end of the shock absorber housing may be provided along a periphery thereof with a flange unit including a plurality of flanges, which are vertically spaced apart from each other so as to define a space therebetween, and the shock absorber housing may be coupled to a vehicle body member in the state in which the vehicle body member is fitted into the space in the flange unit.

The shock absorber housing may be coupled to the vehicle body member or the shock absorber via an upper surface, a lower surface or a side surface of the space in the flange unit in the state in which the vehicle body member is fitted into the space in the flange unit.

The vehicle body member may be configured to extend in a longitudinal direction and to have a closed surface at an end thereof, and the closed surface, an upper surface or a lower surface of the vehicle body member may be coupled to the flange unit in a surface-contact state.

The vehicle body member may be configured to extend with an internal space therein and to have an open surface, and may be coupled to the flange unit using a tool introduced through the open surface.

A pillar member, which connects a front shock absorber housing to a rear shock absorber housing so as to define a cabin, may be coupled to the shock absorber housing, may be coupled at an end thereof to the lower end of the shock absorber housing, and may be supported by or coupled to a side wall of the projection of the shock absorber housing at an inner surface thereof.

A support member connecting the shock absorber housing to the pillar member may be coupled to the shock absorber housing, and the support member may be coupled at one end thereof to one side of the lower end of the shock absorber housing, may extend upwards therefrom, and may be coupled at an upper end thereof to a side surface of the pillar member.

The lower end of the shock absorber housing may be provided with a coupler projecting upwards from the lower end, and the support member may be supported by or coupled to a side surface of the coupler or to an outer surface of the projection.

The shock absorber housing may be coupled to a front or rear lower truss member, which extends downwards and is then bent so as to connect a plurality of front or rear shock absorber housings to each other in the width direction of the vehicle, or to a lateral lower truss member, which extends downwards and is then bent so as to connect a plurality of lateral shock absorber housings to each other in the longitudinal direction of the vehicle.

Each of the plurality of shock absorber housings may be provided thereunder with a floor member, and may be supported by the floor member via a plurality of connection members.

The connection members may be coupled at upper ends thereof to lower surfaces of corners of the shock absorber housing that face an inside of the vehicle, may extend downwards while being inclined in the outward direction of the shock absorber housing, and may be coupled at lower ends thereof to an upper surface of the floor member.

The lower end of each of the shock absorber housings may include a plurality of corners, one of which has a cut portion configured to have an obtuse angle.

The plurality of shock absorber housings may include four shock absorber housings positioned at lateral sides of front and rear sides of the vehicle, and each of the shock absorber housings may be oriented and assembled such that a cut portion thereof faces an outside of the vehicle.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
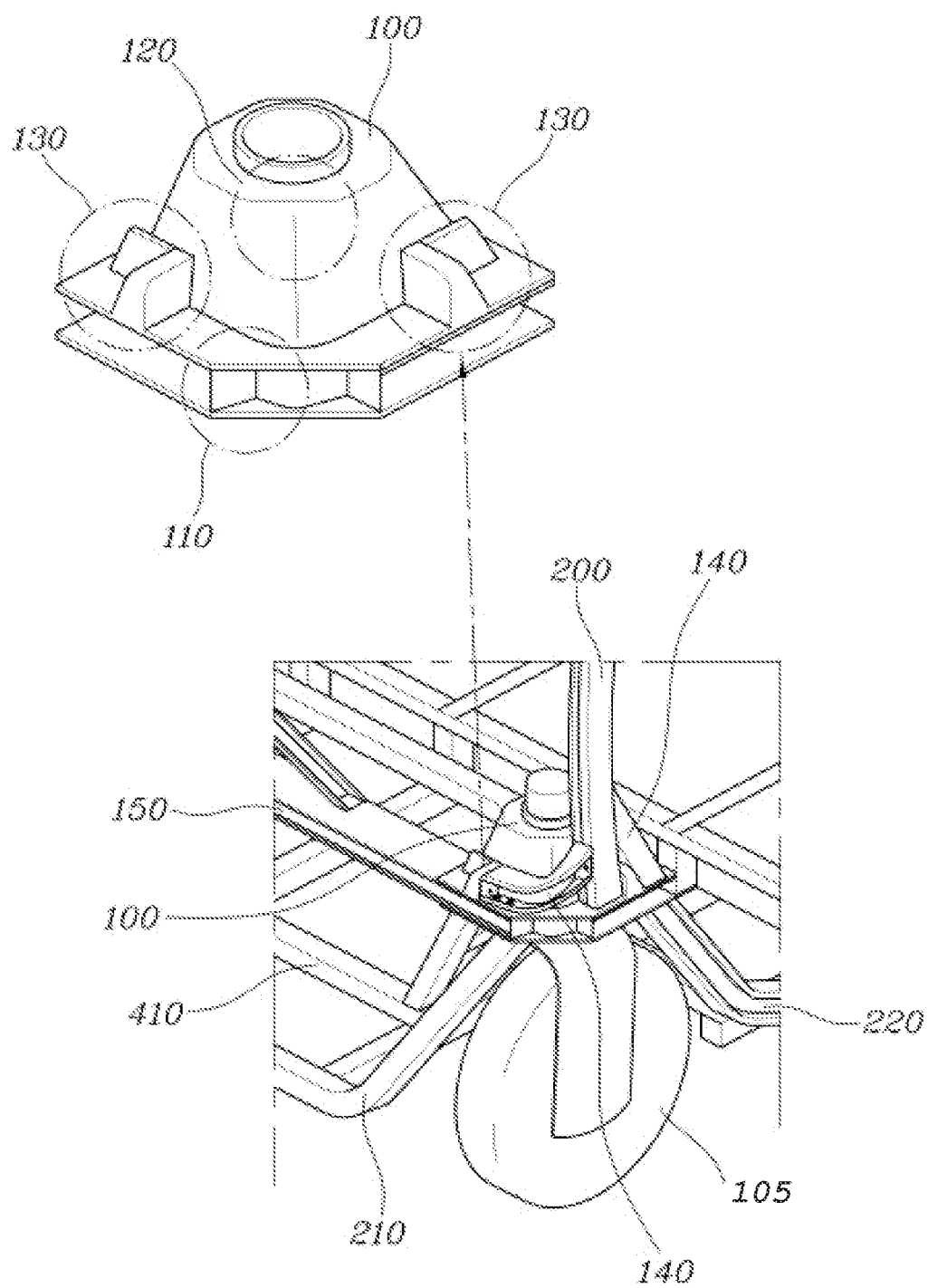
FIG. 1 is a view illustrating a shock absorber housing of the vehicle body according to an embodiment of the present invention.
Figure 2:
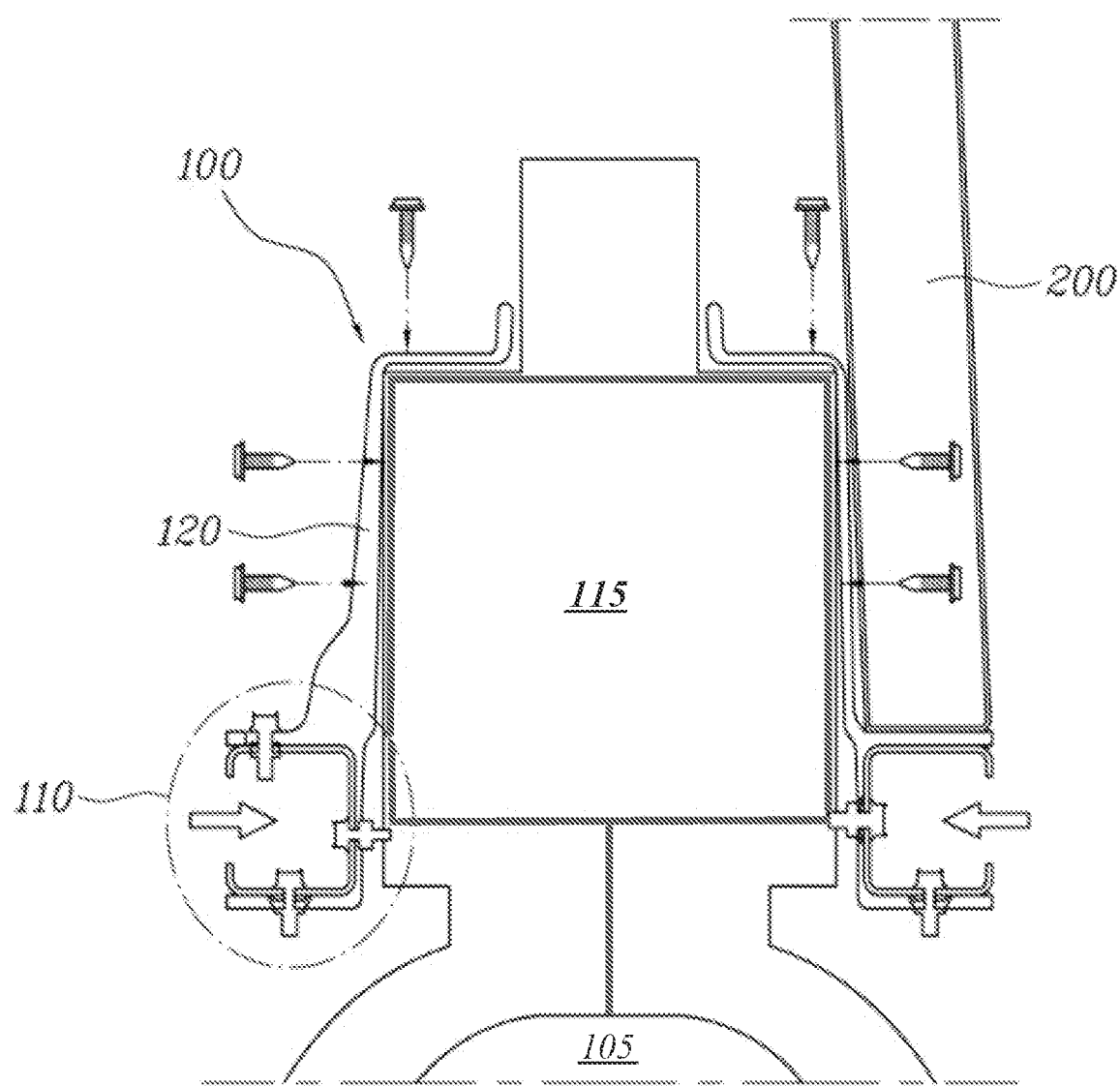
FIG. 2 is a side elevation view illustrating the shock absorber housing of the vehicle body according to an embodiment of the present invention.
Figure 3:
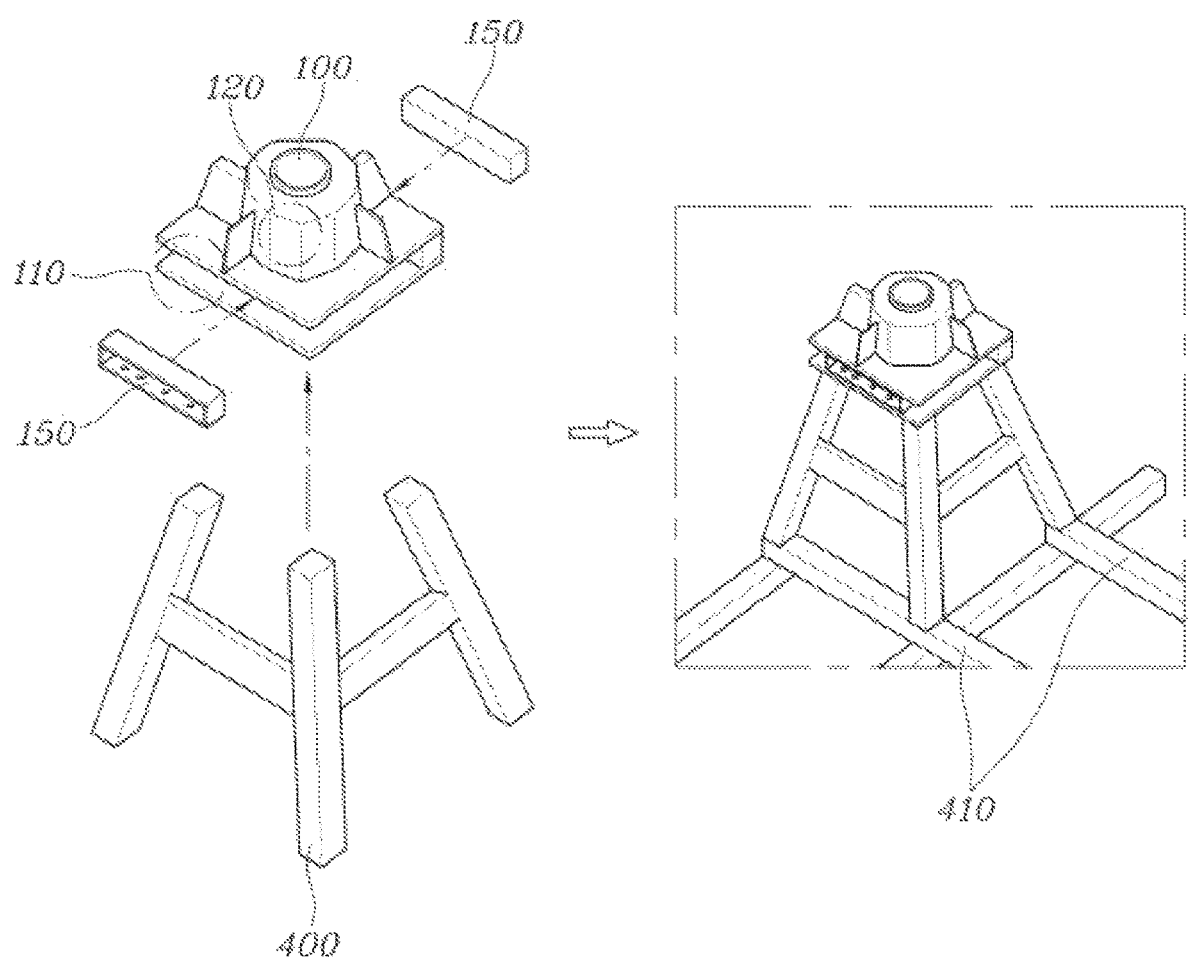
FIG. 3 is a view illustrating the vehicle body according to an embodiment of the present invention in which a vehicle body member and a connection member are coupled to the shock absorber housing.
Figure 4:
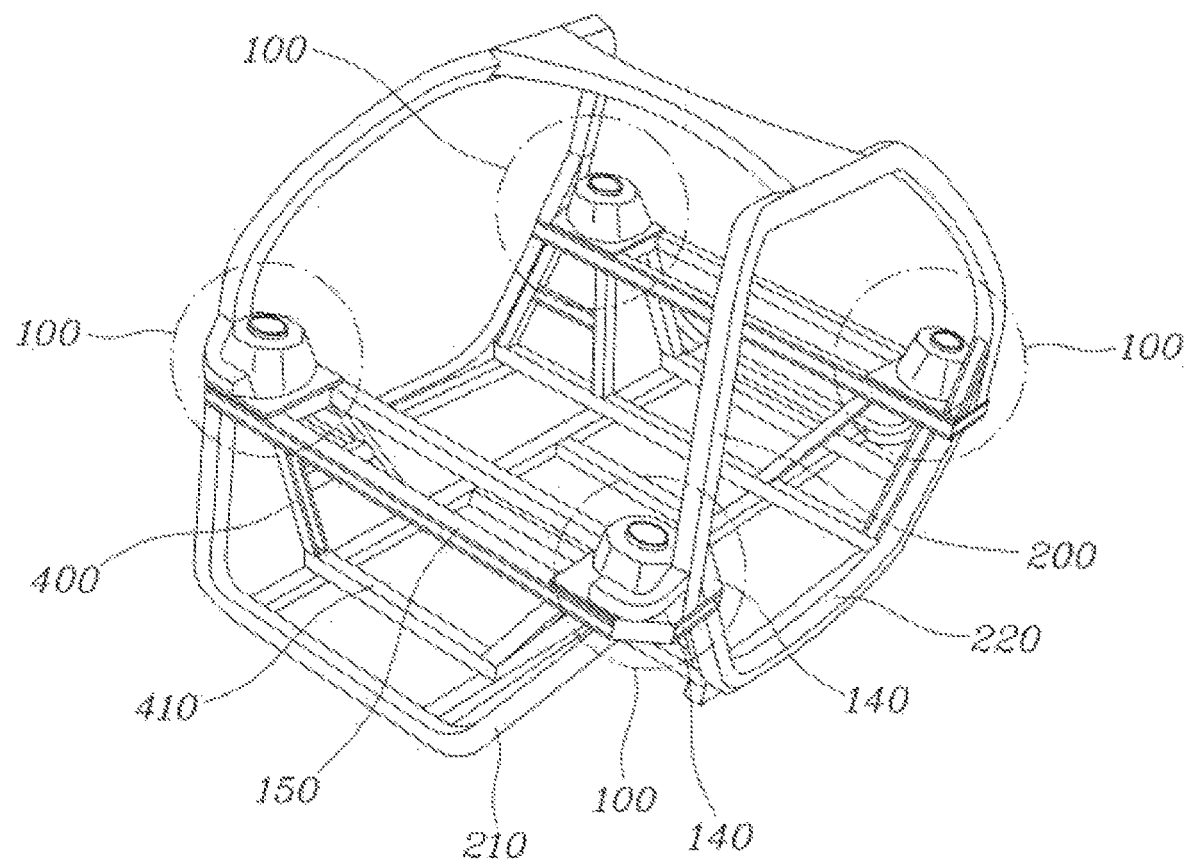
FIG. 4 is a view illustrating the vehicle body according to an embodiment of the present invention in which four shock absorber housings are provided at lateral sides of the front and rear sides of the vehicle.

FIG. 1 is a view illustrating a shock absorber housing of the vehicle body according to an embodiment of the present invention. FIG. 2 is a side elevation view illustrating the shock absorber housing of the vehicle body according to an embodiment of the present invention. FIG. 3 is a view illustrating the vehicle body according to an embodiment of the present invention in which a vehicle body member and a connection member are coupled to the shock absorber housing. FIG. 4 is a view illustrating the vehicle body according to an embodiment of the present invention in which four shock absorber housings are provided at lateral sides of the front and rear sides of the vehicle.

The vehicle body according to an embodiment of the present invention includes a plurality of shock absorber housings 100, which cover and support respective shock absorbers 115 connected to the wheels of the vehicle. Each of the shock absorber housings 100 includes a projection 120, which projects upwards from the lower end of the shock absorber housing 100 with an internal space therein. The lower end of the shock absorber housing 100 or the projection 120 is coupled to the shock absorber 115 in the state in which the shock absorber 115 is disposed in the internal space in the projection 120.

The internal space in the shock absorber housing 100 is configured to have a cylindrical shape, and the lower end of the shock absorber housing 100 or the projection 120 may be coupled to the shock absorber 115 through the side surface or the upper surface of the internal space in the state in which the shock absorber 115 is disposed in the internal space in the projection 120.

Unlike conventional vehicles, the vehicle body according to an embodiment of the present invention is intended to be applied to a vehicle adopting an in-wheel system, and does not require a drive shaft or a steering device to be connected to the wheels. Accordingly, each of the wheels of the vehicle is provided with the shock absorber 115 and the shock absorber housing 100, which are disposed above the wheel 105. The shock absorber housing 100 includes the projection 120, which projects with the internal space therein such that the shock absorber 115 is positioned in the internal space in the projection 120. Since the shock absorber 115 is disposed in the internal space and is coupled to the inner wall of the shock absorber housing 100 and supported thereby, the shock absorber housing boo protects the wheel 105 of the vehicle and the shock absorber 115 disposed above the wheel 105.

In the vehicle body according to an embodiment of the present invention, the shock absorber housing 100 is provided at the lower end thereof with a flange unit 110 composed of a plurality of flanges, which are formed along the outer periphery of the lower end of the shock absorber housing 100 and are vertically spaced apart from each other. The shock absorber housing 100 may be coupled to a vehicle body member 150 in the state in which the vehicle body member 150 is fitted into the space between the flanges of the flange unit 110. Furthermore, the shock absorber housing 100 may be coupled to the vehicle body member 150 or the shock absorber 115 through the upper surface, the lower surface or the side surface of the space in the flange unit in the state in which the vehicle body member 150 is fitted into the space in the flange unit 110.

Specifically, the shock absorber housing 100 includes the lower end and the projection 120 projecting from the lower end. The lower end of the shock absorber housing 100 is provided with the flange unit 110, including a plurality of flanges, which are vertically spaced apart from each other so as to define the space having a 'U'-shaped cross-section therebetween. One of various vehicle body members 150 is coupled in the space through an open surface of the flange unit. The vehicle body member 150 is also configured to have an open cross-section so as to correspond to the space, and is fitted into the space and is coupled to the flange unit 110 of the shock absorber housing 100.

The vehicle body member 150 is configured to extend longitudinally, and has a closed surface at the end thereof. The closed surface, the upper surface, the lower surface or the side surface of the vehicle body member 150 may be coupled to the flange unit no in the surface-contact state. The vehicle body member 150 may be configured to extend with an internal space therein and to be open at one surface thereof, whereby the vehicle body member 150 is coupled to the flange unit no using a tool introduced into the internal space through the open surface.

Specifically, because the vehicle body member 150 is fitted into the flange unit no so as to be assembled therewith and is open at one surface thereof so as to have an open cross-section, the vehicle body member 150 is in surface contact with the inner surface of the space of the flange unit no when the vehicle body member 150 is coupled to the flange unit no. The vehicle body member 150 is fitted into the space in the flange unit no, and is coupled to the inner surface of the space through bolting using a tool introduced through the open surface of the vehicle body member iso. This coupling method makes it possible to maintain the rigidity of the vehicle itself and the coupling rigidity between the members when the shock absorber housing 100 is coupled to the vehicle body member iso, and enables a human or a robot to conveniently and easily assemble the members.

In the vehicle body according to an embodiment of the present invention, a pillar member 200, which connects a front shock absorber housing 100 to a rear shock absorber housing 100 so as to define the cabin, is coupled to the shock absorber housing 100. The pillar member 200 is coupled at an end thereof to the lower end of the shock absorber housing 100, and is coupled at the inner surface thereof to the side wall of the projection 120 of the shock absorber housing 100 and is supported thereby.

Specifically, the pillar member 200 is bent upwards at the lateral side of the vehicle and extends upwards therefrom so as to increase the collision rigidity of the vehicle in a lateral collision and to define the cabin room, and connects the individual shock absorber housings 100 to each other in the longitudinal direction of the vehicle. The pillar member 200 is coupled at the lower end thereof to the lower end of the shock absorber housing 100. Specifically, the pillar member 200 is coupled to the lower end of the shock absorber housing 100 through the space in the flange unit no, and the inner surface of the pillar member 200 is coupled to the side wall of the projection 120 and is supported thereby, thereby ensuring the rigidity of the vehicle and the coupling rigidity between the pillar member 200 and the shock absorber housing 100.

In the vehicle body according to an embodiment of the present invention, a support member 140, which connects the shock absorber housing 100 to the pillar member 200 and supports them, may be coupled to the shock absorber housing 100. The support member 140 may be coupled at one end thereof to one side of the lower end of the shock absorber housing 100, and may extend upwards therefrom. The support member 140 may be coupled at the upper end thereof to the side surface of the pillar member 200. The lower end of the shock absorber housing 100 may be provided with a coupler 130, which projects upwards from the lower end of the shock absorber housing 100, and the lower end of the support member 140 may be coupled to the side surface of the coupler 130 or the outer surface of the projection 120, and may be supported thereby.

Consequently, since the pillar member 200 is not only coupled at the end thereof to the lower end of the shock absorber housing 100 but is also supported at the inner surface thereof by the side wall of the projection 120, which has an 'L'-shaped cross-section and projects upwards, it is possible to support a greater load by means of the projection 120 of the shock absorber housing 100 when an impact is applied to the vehicle body. Furthermore, because the support member 140 is coupled to the side surface of the coupler 130 provided at the lower end of the shock absorber housing 100 or the outer side surface of the projection 120 in the surface-contact state, it is possible to sufficiently ensure the rigidity of the vehicle body and the coupling rigidity between the members.

In the vehicle body according to an embodiment of the present invention, a front or rear lower truss member 210, which extends downwards and is then bent so as to connect a plurality of front or rear shock absorber housings 100 to each other in the width direction of the vehicle, or a lateral lower truss member 220, which extends downwards and is then bent so as to connect a plurality of lateral shock absorber housings wo to each other in the longitudinal direction of the vehicle, may be coupled to the shock absorber housing wo.

Specifically, the pillar member 200 is coupled at the lower end thereof to the shock absorber housing wo. Here, because the pillar member 200 is more securely coupled to the shock absorber housing 100 in an anteroposterior direction by means of the support member 140, when a load is applied to the pillar member 200, the pillar member 200 distributes or transmits the load to the shock absorber housing wo, to the front or rear lower truss member 210 coupled to the lower end of the shock absorber housing 100 so as to increase collision rigidity in anteroposterior and lateral directions, and to the lateral lower truss member 220 via the support member 140. Similarly, when a load is applied to the shock absorber housing wo, the front or rear lower truss member 210 or the lateral lower truss member 220, the load is distributed to the various members, thereby minimizing the impact caused by the load.

FIG. 3 is a view illustrating the vehicle body according to an embodiment of the present invention in which the vehicle body member and the connection member are coupled to the shock absorber housing. FIG. 4 is a view illustrating the vehicle body according to an embodiment of the present invention in which four shock absorber housings are provided at lateral sides of the front and rear sides of the vehicle. In the vehicle body according to an embodiment of the present invention, the plurality of shock absorber housings wo may be provided thereunder with a grid-shaped floor member 410, and each of the shock absorber housings wo may be supported by the floor member 410 via a plurality of connection members 400. Each of the connection members 400 may be coupled at the upper end thereof to the corners among the corners of a corresponding shock absorber housing wo that faces the inside of the vehicle, may extend downwards therefrom while being inclined in the outward direction of the shock absorber housing wo, and may be coupled at the lower end to the upper surface of the floor member 410.

Specifically, the connection member 400 may be coupled at the upper end thereof to the lower surface of the corners that face the inside of the vehicle, among the plurality of corners of the shock absorber housing wo, may extend downwards therefrom while being inclined in the outward direction of the shock absorber housing wo, and may be coupled at the lower end thereof to the upper surface of the floor member 410. Since the connection member 400 extends downwards while being inclined in the outward direction of the shock absorber housing wo, it is possible to ensure the maximum space under the shock absorber housing wo in which the wheel is positioned. Furthermore, since the connection member 400 supports, at the upper end thereof, the shock absorber housing wo, the wheel of an in-wheel system vehicle is capable of being normally rotated and moved under the shock absorber housing 100.

In the vehicle body according to an embodiment of the present invention, the lower end of the shock absorber housing wo may include a plurality of corners, and one of the corners may be provided with a cut portion, which is formed to have an obtuse angle. Four shock absorber housings wo may be provided at the lateral sides of the front and rear sides of the vehicle such that the cut portions thereof are oriented so as to face the outside of the vehicle.

Specifically, since the shock absorber housings wo, which are positioned at the lateral sides of the front and rear sides of the vehicle, are manufactured to have the same configuration rather than being manufactured to have different configurations, and are mounted only with a changed orientation, it is possible to improve manufacturing efficiency and to reduce manufacturing costs. Furthermore, since the cut portion of each of the shock absorber housings wo faces the outside of the vehicle so as to provide space for normal operation of the wheel of the in-wheel system vehicle, it is possible to support a load between the various members or to distribute the load in directions of the members, and it is possible to prevent the corner of the shock absorber housing 100 from projecting outwards beyond the vehicle.

The shock absorber housing wo and the vehicle body members according to an embodiment of the present invention may be coupled to each other by bolting. Since the shock absorber housings wo or the vehicle body members are not manufactured so as to have different configurations but are manufactured so as to have the same configuration, and are symmetrically assembled in the vehicle, there is an advantage in terms of ease of assembly and production of the vehicle and an effect of ensuring assembly rigidity and ability to withstand a collision. Furthermore, since the vehicle body is conveniently assembled simply by bolting the flange unit no of the shock absorber housing wo or the ends of the members having an open or closed cross-section, it is possible for a human or a robot to conveniently perform the assembly process in a short period.

As is apparent from the above description, embodiments of the present invention provide a vehicle body of an in-wheel platform vehicle including a plurality of shock absorber housings, which are positioned above respective wheels of the vehicle and each of which includes a projection projecting upwards from the lower end thereof and having an internal space therein, in which a shock absorber connected to the wheel is disposed in the internal space in the projection and is coupled to the shock absorber so as to cover and support the shock absorber.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle body comprising:
a plurality of shock absorber housings, each shock absorber housing adapted to cover and support a respective shock absorber connected to a respective wheel of a vehicle; and
a floor member under each of the plurality of shock absorber housings,
wherein each of the plurality of shock absorber housings is supported by the floor member via a plurality of connection members,
wherein each of the shock absorber housings comprises a projection projecting upwards from a lower end of the shock absorber housing, the shock absorber housing comprising an internal space, and
wherein the lower end of the shock absorber housing or the projection is coupled to the shock absorber such that the shock absorber is disposed in the internal space.

2. The vehicle body according to claim 1, wherein the internal space has a cylindrical shape and the lower end of the shock absorber housing or the projection is coupled to the shock absorber via a side surface or an upper surface of the internal space such that the shock absorber is disposed in the internal space.

3. The vehicle body according to claim 1, further comprising a pillar member connecting a front shock absorber housing of the plurality of shock absorber housings to a rear shock absorber housing of the plurality of shock absorber housings to define a portion of a cabin, wherein an end of the pillar member is coupled to a lower end of the front shock absorber housing and a lower end of the rear shock absorber housing, and an inner surface of the pillar member is supported by or coupled to a side wall of the projection of the respective shock absorber housing.

4. The vehicle body according to claim 3, further comprising a support member coupled to the shock absorber housing and connecting the shock absorber housing to the pillar member, wherein a lower end of the support member is coupled to one side of the lower end of the shock absorber housing, the support member extends upwards therefrom, and an upper end of the support member is coupled to a side surface of the pillar member.

5. The vehicle body according to claim 4, further comprising a coupler at the lower end of the shock absorber housing and projecting upwards, wherein the support member is supported by or coupled to a side surface of the coupler or to an outer surface of the projection.

6. The vehicle body according to claim 1, further comprising a front or rear lower truss member coupled to the shock absorber housing, wherein the front or rear lower truss member extends downward and is then bent so as to connect two front or two rear shock absorber housings of the plurality of shock absorber housings to each other in a width direction of the vehicle.

7. The vehicle body according to claim 1, further comprising a lateral lower truss member coupled to the shock absorber housing, wherein the lateral lower truss member extends downward and is then bent so as to connect two lateral shock absorber housings of the plurality of shock absorber housings to each other in a longitudinal direction of the vehicle.

8. The vehicle body according to claim 1, wherein upper ends of the connection members are coupled to lower surfaces of corners of the shock absorber housings that face an inside of the vehicle, wherein the connection members extend downward while being inclined in an outward direction from the shock absorber housings, and wherein lower ends of the connection members are coupled to an upper surface of the floor member.

9. The vehicle body according to claim 1, wherein the lower end of each of the shock absorber housings includes a plurality of corners, and wherein one of the corners has a cut portion having an obtuse angle.

10. The vehicle body according to claim 9, wherein the plurality of shock absorber housings include four shock absorber housings positioned at lateral sides of front and rear sides of the vehicle, and wherein each of the shock absorber housings is oriented and assembled such that a corresponding one of the cut portions faces an outside of the vehicle.

11. A vehicle body comprising:
a shock absorber housing covering and supporting a shock absorber that is configured to be connected to a wheel of a vehicle, wherein the shock absorber housing comprises a projection projecting upwards from a lower end of the shock absorber housing, the shock absorber housing comprising an internal space, and wherein the lower end of the shock absorber housing or the projection is coupled to the shock absorber such that the shock absorber is disposed in the internal space;
- a flange unit disposed along a periphery of the lower end of the shock absorber housing, wherein the flange unit comprises a plurality of flanges vertically spaced apart from each other to define a space in the flange unit; and
- a vehicle body member coupled to the shock absorber housing such that the vehicle body member is fitted into the space in the flange unit.

12. The vehicle body according to claim 11, wherein the shock absorber housing is coupled to the vehicle body member or the shock absorber via an upper surface, a lower surface or a side surface of the space in the flange unit such that the vehicle body member is fitted into the space in the flange unit.

13. The vehicle body according to claim 11, wherein the vehicle body member extends in a longitudinal direction and has a closed surface at an end thereof, and wherein the closed surface, an upper surface or a lower surface of the vehicle body member is coupled to the flange unit in a surface-contact state.

14. The vehicle body according to claim 13, wherein the vehicle body member has an internal space therein, has an open surface, and is configured to be coupled to the flange unit using a tool introduced through the open surface.

15. A vehicle comprising:
- a plurality of wheels;
- a plurality of shock absorbers, each shock absorber connected to a respective one of the wheels;
- a plurality of shock absorber housings each covering and supporting a respective one of the shock absorbers, wherein each of the shock absorber housings comprises a projection projecting upwards from a lower end of the shock absorber housing, the shock absorber housing comprising an internal space, and wherein the lower end of the shock absorber housing or the projection is coupled to the shock absorber such that the shock absorber is disposed in the internal space;
- a pillar member connecting a front shock absorber housing of the plurality of shock absorber housings to a rear shock absorber housing of the plurality of shock absorber housings to define a portion of a cabin, wherein an end of the pillar member is coupled to a lower end of the front shock absorber housing and a lower end of the rear shock absorber housing, and an inner surface of the pillar member is supported by or coupled to a side wall of the projection of the respective shock absorber housing;
- a support member coupled to the shock absorber housing and connecting the shock absorber housing to the pillar member, wherein a lower end of the support member is coupled to one side of the lower end of the shock absorber housing, the support member extends upwards therefrom, and an upper end of the support member is coupled to a side surface of the pillar member;
- a coupler disposed at the lower end of the shock absorber housing and projecting upwards, wherein the support member is supported by or coupled to a side surface of the coupler or to an outer surface of the projection;
- a front or rear lower truss member extending downward and then bending so as to connect two front or two rear shock absorber housings of the plurality of shock absorber housings to each other in a width direction of the vehicle; and
- a lateral lower truss member extending downward and then bending so as to connect two lateral shock absorber housings of the plurality of shock absorber housings to each other in a longitudinal direction of the vehicle.

16. The vehicle according to claim 15, wherein the internal space in the projection has a cylindrical shape, and the lower end of the shock absorber housing or the projection is coupled to the shock absorber via a side surface or an upper surface of the internal space such that the shock absorber is disposed in the internal space in the projection.

17. The vehicle according to claim 15, further comprising a floor member under each of the plurality of shock absorber housings, wherein each of the plurality of shock absorber housings is supported by the floor member via a plurality of connection members.

18. The vehicle according to claim 17, wherein:
- upper ends of the connection members are coupled to lower surfaces of corners of the shock absorber housings that face an inside of the vehicle;
- the connection members extend downward while being inclined in an outward direction from the shock absorber housings; and
- lower ends of the connection members are coupled to an upper surface of the floor member.

19. The vehicle according to claim 15, wherein the lower end of each of the shock absorber housings includes a plurality of corners, and wherein one of the corners has a cut portion having an obtuse angle.

* * * * *